United States Patent
Watkins

(10) Patent No.: US 7,778,252 B2
(45) Date of Patent: Aug. 17, 2010

(54) HARDWARE MONITOR OF LIN TIME BUDGET

(75) Inventor: Steven K. Watkins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 932 days.

(21) Appl. No.: 11/436,234

(22) Filed: May 18, 2006

(65) Prior Publication Data

US 2007/0268991 A1 Nov. 22, 2007

(51) Int. Cl.
*H04L 12/28* (2006.01)
*H04L 7/00* (2006.01)
*H04J 3/06* (2006.01)

(52) U.S. Cl. ............... 370/395.62; 370/509; 370/518; 370/520; 375/355; 375/356

(58) Field of Classification Search ............ 370/395.62, 370/503–520
See application file for complete search history.

(56) References Cited

U.S. PATENT DOCUMENTS 5,422,889 A * 6/1995 Sevenhans et al. .......... 370/442
2002/0101884 A1 * 8/2002 Pohlmeyer et al. .......... 370/509
2005/0154824 A1 * 7/2005 Bruner et al. ............... 711/112
2005/0286432 A1 * 12/2005 Yasuie et al. ................ 370/244
2006/0245515 A1 * 11/2006 Tachi .......................... 375/293
2007/0168580 A1 * 7/2007 Schumacher ................ 710/30

OTHER PUBLICATIONS

Philippe Larcher, Designing a Compact and Flexible LIN Controller, Revision A, Cypress MicroSystems, Sep. 17, 2002.
Hans-Christian von der Wense, Introduction to LIN (Local Interconnect Network), Mar. 2000.

* cited by examiner

*Primary Examiner*—Daniel J. Ryman
*Assistant Examiner*—Thinh D Tran
(74) *Attorney, Agent, or Firm*—Dillon & Yudell LLP

(57) ABSTRACT

Local Interconnect Network message budget calculation error is reduced by utilizing an eight bit time measurement of the sync byte in the message header. The method determines the header budget separately from the data budget, simplifying the required logic. The sync byte reference time is multiplied by the message data size to determine the data budget.

15 Claims, 6 Drawing Sheets

HARDWARE MONITOR OF LIN TIME BUDGET

BACKGROUND OF THE INVENTION

1. Field of the Invention

The invention relates generally to Local Interconnect Networks (LINs), and particularly to a method and apparatus to determine a message time budget on a LIN bus.

2. Description of the Related Art

The Local Interconnect Network (LIN) standard has been created by a group of automotive companies as a means to provide low-cost networks in vehicles. The reduced cost of LIN components is, in part, due to a master-slave single bus with no expensive crystals or resonators on slave modules for clock generation or synchronization.

Messages on LIN networks have known lengths that may be determined by examining the header of each message. Slave nodes determine the communication rate on a LIN network by analyzing a sychronization (SYNC) byte at the beginning of each received message. Knowing the message length and the rate of transmission, slave nodes know the amount of time it should take to receive the entire message. However, since slave nodes do not contain expensive crystals or ceramic resonators for accurate timing, the LIN specification provides that a time budget of 140% of the expected transmission time be given to complete reception of a message. If the message is not received within the budgeted time, the message is rejected.

Current methods employed to calculate a LIN message budget rely upon the measurement of a single bit time from the SYNC byte in the header of each message. This method results in inaccurate message budget calculations that may lead to the improper rejection of valid messages. For example, in the case of a LIN network operating at 19.2 KHz transmitting an eight byte message, the single bit time measurement calculation yields an error of 7.5 microseconds. Consequently, any valid message that completes transmission during the error period is improperly rejected. Therefore, a need exists for an improved method of calculating LIN time budgets that reduces the number of improper message rejections.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, but it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. Further, elements or steps, or combinations thereof that produce equivalent results as those described below may be utilized without departing from the scope of the invention. Although the preferred embodiment is described below with respect to a Local Interconnect Network (LIN) node, it will be appreciated that the present invention is not so limited and that it has application to other embodiments of non-LIN network nodes that utilize time budgets for determining if a message is valid.

Figure 1:
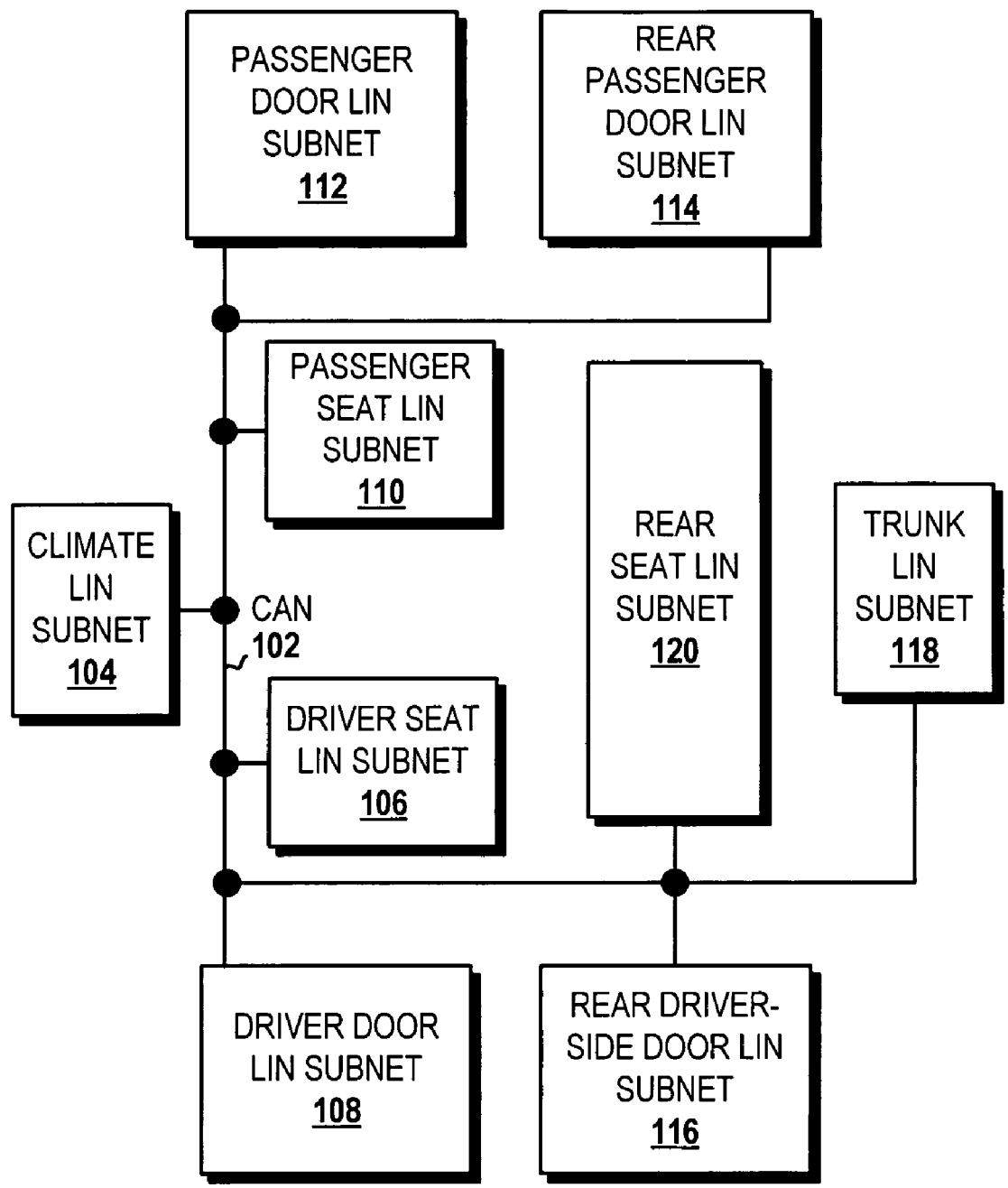
FIG. 1 shows a block diagram of an automotive vehicle with Local Interconnect Network (LIN) subnets connected via a Control Area Network (CAN).

With reference now to the figures, and in particular with reference to FIG. 1, there is shown a block diagram of a typical network in a vehicle comprising multiple LIN subnets. Those skilled in the art will appreciate that various network configurations are possible without departing from the spirit and scope of the invention.

Figure 2:
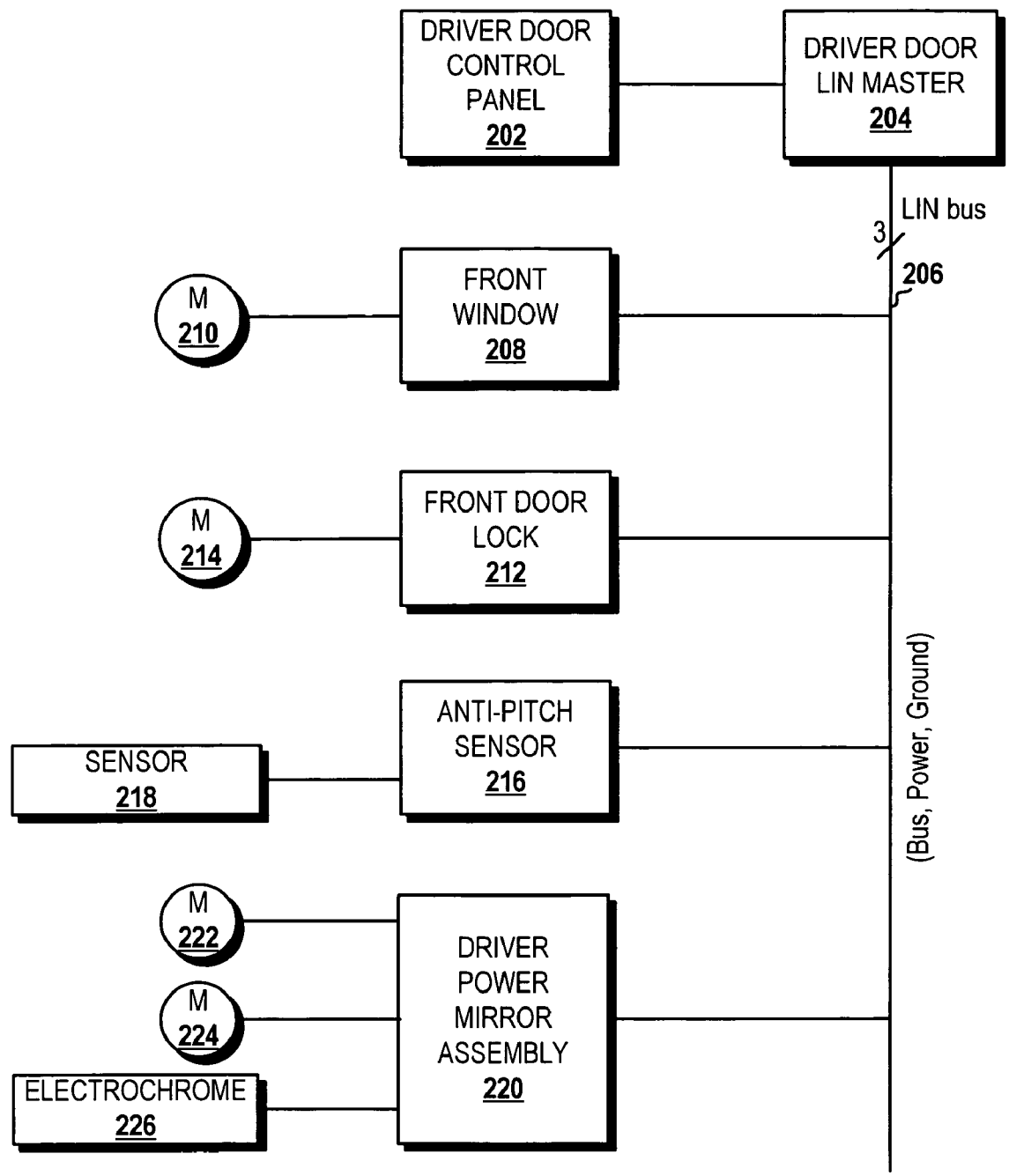
FIG. 2 shows a more detailed block diagram of the driver door LIN subnet depicted in FIG. 1.

Control Access Network (CAN) 102 serves as the backbone of the automotive vehicle network to connect the various LIN subnets depicted in FIG. 1. CAN 102 is a differential 2-wire interface running over either a shielded twisted pair, unshielded twisted pair, or a ribbon cable. Nodes on CAN 102 utilize a male 9-pin D connector and Non Return to Zero encoding for data communication, which ensures compact messages with a minimum number of transitions and high resilience to external disturbance.

Where CAN 102 interfaces with each of the LIN subnets it acts as a master controller, sending and receiving messages from the LIN subnets. One such subnet is Driver Door LIN subnet 108, which controls window lift, door locking, and mirror operation for the vehicles driver side door. A more detailed depiction of Driver Door LIN subnet 108 is shown in FIG. 2.

Another LIN subnet connected to CAN 102 is the Climate LIN subnet 104 which contains slave nodes (not depicted) for controlling motors and receiving data from environmental sensors. The motors controlled by Climate LIN subnet 104 direct airflow to the desired area of the vehicle according to parameters set by the operator.

Driver Seat LIN subnet 106 and Passenger Seat LIN subnet 110 include nodes for operating power seat motors, heating elements, and ventilation fans. Additionally, these subnets and Rear Seat LIN subnet 120 include motor nodes for controlling airflow to their location in the vehicle as desired by the parameters set by the operator.

Driver Door LIN subnet 108 (depicted in detail in FIG. 2), Passenger Door LIN subnet 112, Rear Driver-Side Door LIN subnet 116, and Rear Passenger Door LIN 114 subnet include nodes for controlling door locks, window lift, mirror location, and pitch sensors for roll stabilization. Similarly, Trunk LIN subnet 118 includes sensors and motor nodes for controlling trunk operation and detecting if the vehicle trunk is in the closed position.

With reference now to FIG. 2, there is a more detailed block diagram of Driver Door LIN subnet 108 comprising master and slave LIN nodes that utilize the present invention. Driver Door Control Panel 202 receives input from user commands or from other vehicle systems. Input to Driver Door Control Panel includes a door lock button, a window lift control, and mirror position command buttons. Upon receiving a command, Driver Door Control Panel 202 communicates the command to Driver Door LIN Master 204. A detailed depiction of a command issued on LIN bus 206 is found in FIG. 3.

Driver Door LIN Master 204 serves as the master node for the LIN network consisting of the front window, front door lock, anti-pitch sensor, and driver power mirror assembly subunits.

Upon receiving a command to lower the driver window, Driver Door LIN Master 204 transmits a message to Driver Window LIN Slave 208 to lower the window. Front Window LIN slave receives the message via the LIN bus and drives Motor 210 such that the front window is lowered. Front Window LIN Slave 208 responds to Driver Door LIN Master 208 with a success message to indicate the command was received.

Similar to commands to control the front window, Driver Door Lock LIN Slave 212 responds to commands from Driver Door LIN Master 204 to actuate the door lock mechanism by driving motor 214. Additionally, Driver Door Lock LIN Slave 212 responds to commands to query the status of the door lock mechanism. In response to a vehicle crash, the vehicle reaching a preset velocity, or other event, the vehicle's onboard computer sends a command to Driver Door Lock LIN Slave 212 to query the status of the door lock mechanism. If the door mechanism is unlocked, a second command is sent to Driver Door Lock LIN Slave 212 to lock the door.

During operation of the vehicle, Driver Door LIN Master 204 receives queries from the vehicle stabilization computer for sensor data. When the query is received, Driver Door LIN Master 204 transmits a command to Anti-Pitch Sensor LIN Slave 216 to return sensor data from Sensor 218. Anti-Pitch Sensor 216 receives the command, utilizing the method of the present invention to determine if the command time budget has been exceeded as is described in more detail in FIG. 4. If the command does not exceed its time budget, Anti-Pitch Sensor 216 responds by transmitting a message to Driver Door LIN Master 204 with data from Sensor 218. If the command exceeds the time budget, the command is ignored.

The vehicle operator may desire to adjust the position of the driver side mirror and use the window controls associated with Driver Door Control Panel 202. In response to the user commands, Driver Door Control Panel 202 communicates the request to Driver Door LIN Master 204. Driver Door LIN Master 204 takes control of LIN bus 206 and issues a command to Driver Power Mirror Assembly 220. Utilizing the present invention, Driver Power Mirror Assembly 220 determines if the command was transmitted within the budgeted time. If the command does not exceed the time budget, Driver Power Mirror Assembly 220 driver motor 222 and motor 224 to move the vehicle mirror. If the command exceeds the time budget, the command is ignored.

During nighttime operation, the onboard vehicle controls issue commands to various LIN subnets in the vehicle to engage nighttime driving mode. Driver Door LIN Master 204 receives the message via the CAN network and issues a command on LIN bus 206 to dim the driver side mirror. The command is received by Driver Power Mirror Assembly 220 utilizing the present invention to determine if the command was received within the budgeted time for the command. If the command is valid, Driver Power Mirror Assembly 220 drives Electrochome Unit 226 to dim the glass on the driver side mirror.

Figure 3:
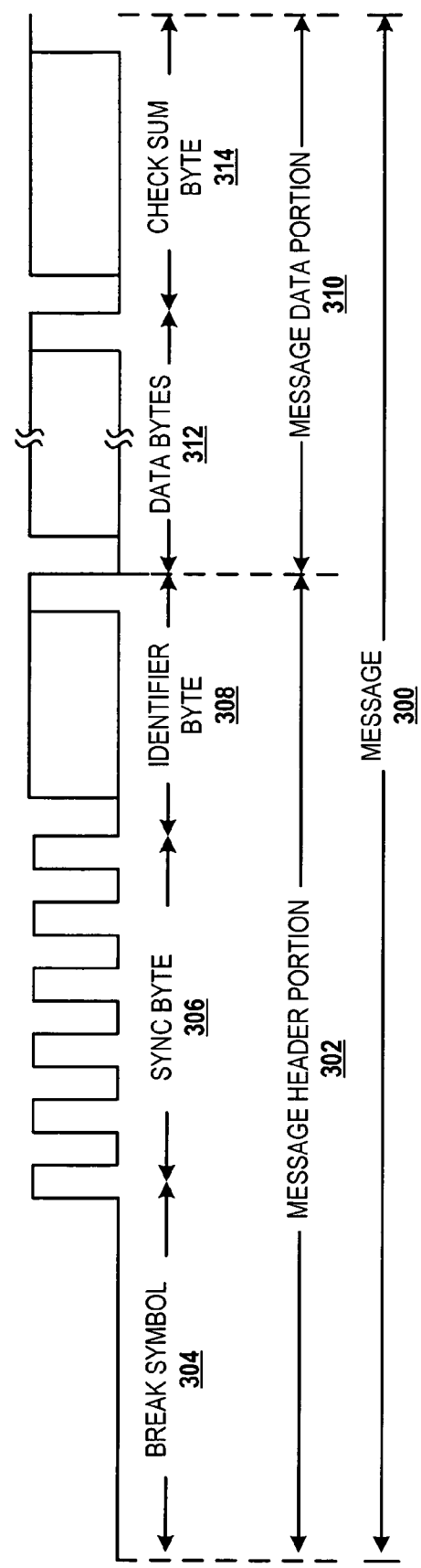
FIG. 3 is a diagram of a LIN message.

With reference now to FIG. 3, there is shown a detailed diagram of a LIN message format transmitted over a LIN network. LIN Message 300 comprises two major components, Message Header 302 and Message Data 310. Message Header 302 begins with Break Symbol 304 that allows slaves on the LIN network to prepare to receive a LIN message. Following Break Symbol 304 is an eight bit Sync Byte 306 that is used by LIN slave modules to determine the transmission rate on the LIN bus. The transmission rate of the bus is determined by measuring the time of either five rising or falling edges and dividing by eight. In the present invention, the bit times for eight bits of the sync byte are measured to accurately determine the message budget as is described in more detail in FIG. 4.

Identifier Byte 308 is the remaining portion of Message Header 302. Identifier Byte 308 is associated with known message lengths. Under previous LIN specifications, there are three classes of data message lengths: two byte, four byte, and eight byte. The current LIN specification permits any data length of eight bytes or less to be associated with any message. Typically, the length of the data is determined by utilizing a lookup table.

After receiving Identifier Byte 308 and measuring the eight bit times in Sync Byte 306, the method of the present invention more accurately calculates the budget time for the message. A more detailed flow diagram for the present invention is found in FIG. 4.

Data Bytes 312 are followed by Checksum Byte 314 to complete Message Data 310 and signifies the end of Message 300. Checksum Byte 314 contains the inverted modulo-256 sum of Bytes 312, wherein the sum is calculated by utilizing an "add and carry" on Data Bytes 312 and then inverting the result.

Checksum Byte 314 is utilized by LIN nodes to determine if an error occurred during the reception of a message. LIN nodes verify the integrity of messages by adding Data Bytes 312 and Checksum Byte 314. A property of using the method utilized to calculate Checksum Byte 314 results in a sum of 0xFF if there were no reception errors.

Figure 4:
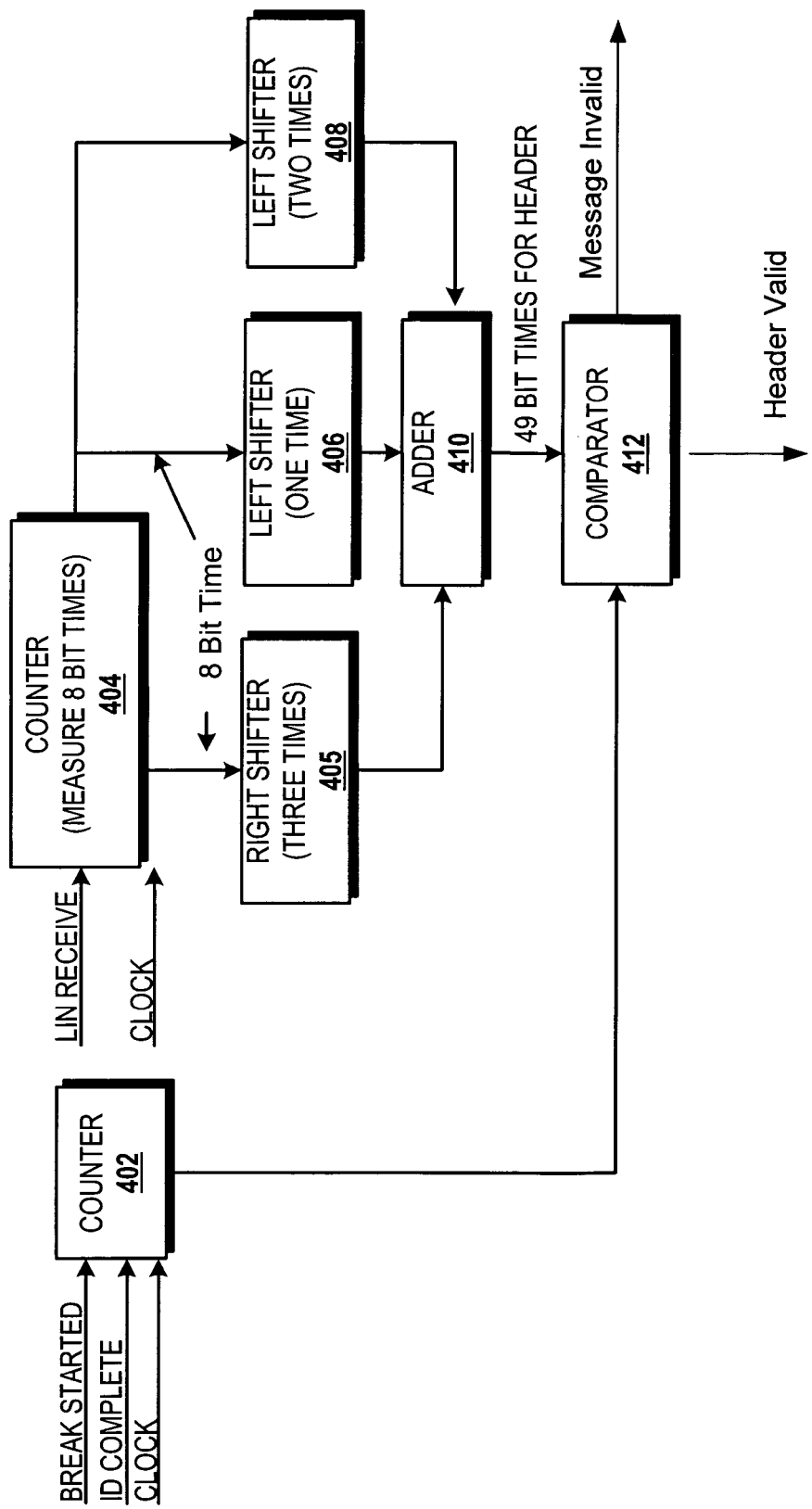
FIG. 4 depicts a block diagram of a LIN slave node that verifies the header budget of a message, in accordance with a preferred embodiment of the present invention.
Figure 5:
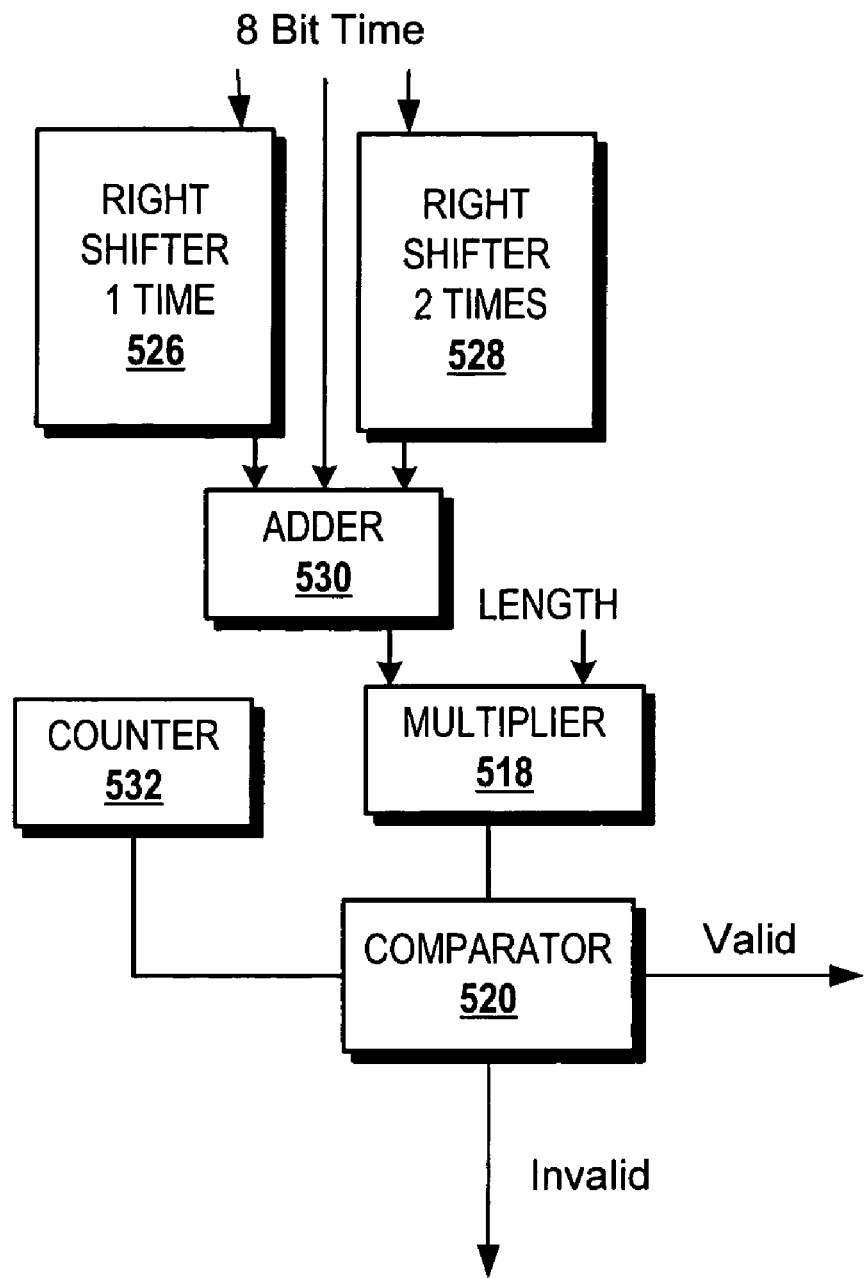
FIG. 5 depicts a block diagram of a LIN slave node that verifies the data budget of a message, in accordance with a preferred embodiment of the present invention.

With reference now to FIG. 4 and FIG. 5, there are block diagrams for a preferred embodiment of the present invention to more accurately calculate message budgets. In particular, the block diagrams depict a LIN slave node capable of separately determining if the header of a LIN message is received within its budget, and determining if the data portion of the LIN message is received within its budget.

Separately calculating a header and data budget results in a more accurate method for determining the validity of a message while requiring simple hardware on the LIN node. The header size of a LIN message is constant, allowing for its budget to be computed with a few shifts and an addition. The data portion of a LIN message is a multiple of the sync byte size, and this property is utilized in some embodiments to compute the data budget by augmenting the eight bit sync byte measurement with a multiplication by the number of message data bytes plus one for the checksum.

In a preferred embodiment, the LIN slave node contains Counter Block 402 which receives Break Started, Id Complete, and Clock inputs. The Break Started input is active once Break Symbol 304 is detected by the LIN node. ID Complete becomes active once the LIN slave has completed reception of Identifier Byte 308. Clock inputs are utilized to count the relative sizes of the message header and bit time relative to each other. The clock rate is of a high enough frequency compared to the message frequency that the message bit time may be accurately measured. Counter Block 402 tracks the actual number of clock periods that transpire while receiving the message header at the LIN node.

A bit time is the amount of time that a message bit takes to be sent or received. In each node, there is a separate sample clock, possibly running at different frequencies, but, as long as the sample clock is running fast enough to sample the LIN bit time, the LIN message header, and the data portions of the message can all be measured relative to each other. The bit time counter value from Counter Block 402 is utilized by Comparator Block 412 to determine if the message header exceeds the time budget for the header.

Measure Bit Time Block 404 works concurrently with the operations taking place in Counter Block 402. Measure Bit Time Block 404 accepts the same Clock input as Counter Block 402 and an additional LIN receive input that contains the LIN bus data that the LIN node receives from the LIN bus and is utilized to detect the start of the sync byte.

Measure Bit Time Block 404 measures the number of relative clock cycles that transpire while receiving the SYNC portion of messages being transmitted on the LIN bus. The measured number of relative clock cycles (referred to as the 8 Bit Time) is an input value to Right Shifter 405, Left Shifter 406, Left Shifter 408, Right Shifter 526, Right Shifter 528, and Adder 530.

In the preferred embodiment of the present invention, the measurement taken by Measure Bit Time Block 404 is augmented to determine a header budget for the message. The header budget is calculated by a series of shift operations that are performed in Shifter Blocks 405, 406, and 408.

The values computed from Shifter Blocks 405, 406 and 408 are added by Adder Block 410 to compute the header budget in accordance with the present invention. The process of adding the measured eight bit time right shifted three times, left shifted once, and left shifted twice yields a header budget that is approximately 140% of the expected header time.

For example, a single bit time on a LIN bus operating at 19.2 Kbps is approximately 52 microseconds. So, when eight bit times are measured, the total elapsed time is approximately 416.7 microseconds. A LIN slave node with a system clock operating at 8 Mhz (clock period of 125 nanoseconds) will measure 3333 clock cycles (hex $D05). The ideal budget for a LIN message header is 49 bit times (2548 microseconds). If Measure Bit Time Block 404 measures 3333 clock cycles ($D05), then that value is right shifted three times to yield 416 ($1A0) by Right Shifter 405, left shifted once to yield 6666 ($1A0A) by Left Shifter 406, and left shifted twice to yield 13332 ($3414) by Left Shifter 408. The sum of these values, the computed header budget, is 20414 ($4FBE), which is 2552 microseconds.

After receiving the message header, Comparator Block 412 compares the number of clock cycles that transpired receiving the message with the budget calculation arrived at in Adder Block 410. If the number of bit times is less than the budget, the Comparator Block 412 outputs a header valid signal. Otherwise, the Comparator Block 412 outputs a message invalid signal.

In the preferred embodiment of the invention, after determining that the message header is valid, Counter Block 532 is utilized to count the number of clocks that transpire receiving the data portion of the LIN message. In a preferred embodiment of the invention, Counter Block 532 utilizes the same counter as Counter Block 402; however, a second counter may be utilized in alternative preferred embodiments. Counter Block 532 resets the count value to zero after receiving ID Completed and passing the current count value to Comparator Block 412.

With reference now to FIG. 5, there is a block diagram for a preferred embodiment of the present invention to more accurately calculate message budgets. In particular, the block diagram depicts a LIN slave node capable of determining if the data portion (as opposed to the header portion in FIG. 4) of the LIN message is received within its budget.

While receiving the data portion of the message, it is not necessary for Measure Bit Time Block 404 to operate because the bit time has previously been measured. The value of a reference time of the budget (fourteen bit times) is created by utilizing the output from Measure Bit Time Block 404 and calculated utilizing Right Shift Block 526, Right Shift Block 528, and Addition Block 530. The reference time as calculated by Shifter Blocks 405, 406, and 408 and Adder Block 410 is utilized to determine the header budget. Specifically, the reference time is multiplied by the length of the data portion of the message by Multiplier 518, which receives the length of the message and reference time as inputs. The length of the message is known in advance based on the message ID or determined by a software interpretation layer.

Comparator Block 520 accepts the bit time for receiving the data portion of the message as calculated by Counter Block 532 and the data budget as computed by Multiplier Block 518. If the counter value is greater than the data budget, Comparator Block 520 outputs a message invalid signal. Otherwise, Comparator Block 520 outputs a message valid signal.

Figure 6:
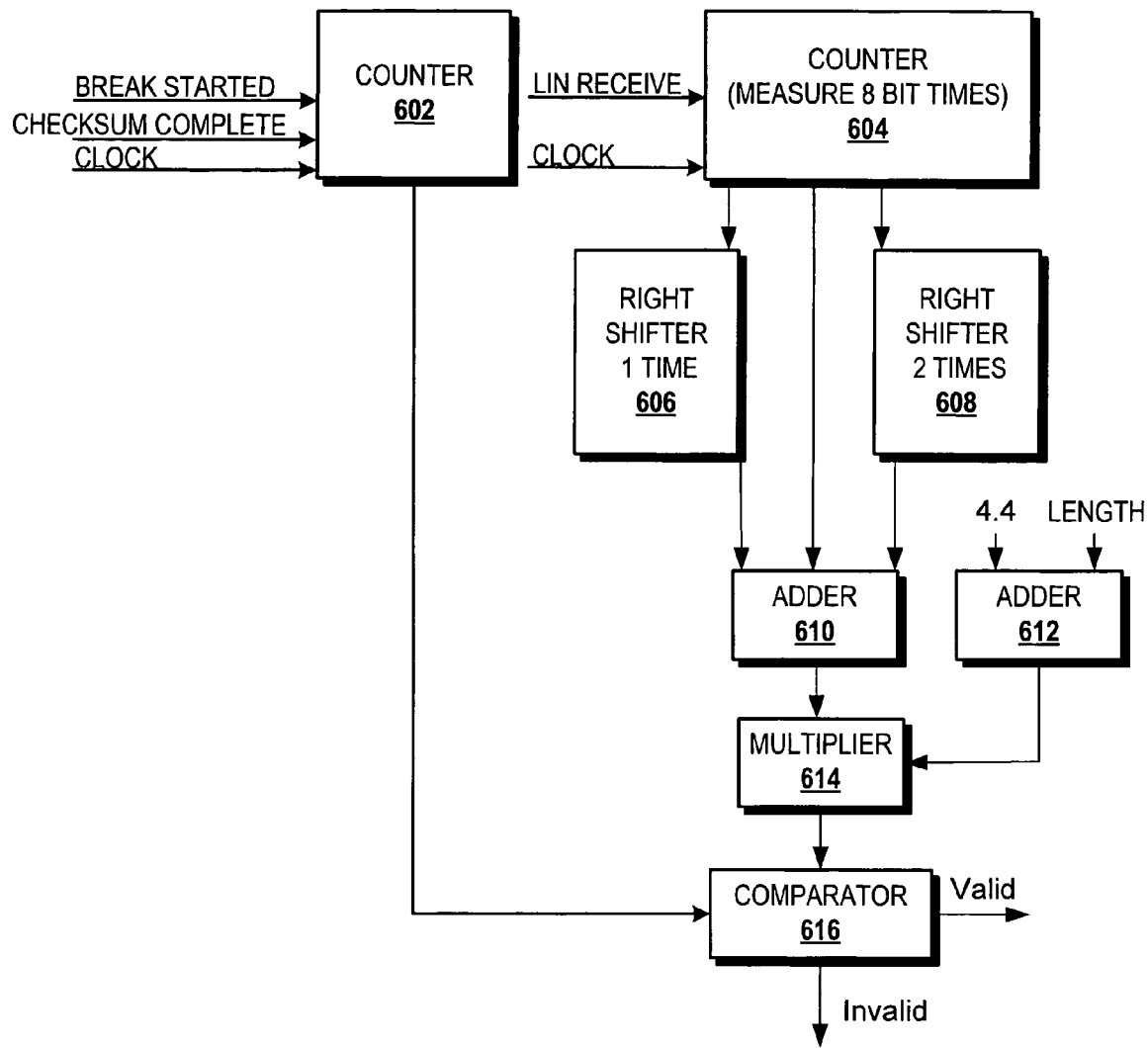
FIG. 6 illustrates a block diagram of a LIN slave node that calculates LIN time budgets wherein the header and data budget are evaluated together, in accordance with a preferred embodiment of the present invention.

With reference now to FIG. 6, there is a block diagram for another preferred embodiment of the present invention to more accurately calculate message budgets. In particular, the block diagram depicts a LIN slave node capable of determining if an entire message is received within its budget.

In a preferred embodiment, the LIN slave node contains Counter Block 602 which receives Break Started, Checksum Complete, and Clock inputs. The Break Started input is active once Break Symbol 304 is detected by the LIN node. Checksum Complete becomes active once the LIN node has completed reception of Checksum Byte 314. Clock inputs are utilized to count the relative sizes of the LIN message and bit time. The clock rate is of a high enough frequency compared to the message frequency that the message bit time may be accurately measured. Counter Block 602 tracks the actual number of clock periods that transpire while receiving the message at the LIN node.

Measure Bit Time Block 604 works concurrently with the operations taking place in Counter Block 602. Measure Bit Time Block 604 accepts the same Clock input as Counter Block 602 and an additional LIN receive input that contains the LIN bus data that the LIN node receives from the LIN bus and is utilized to detect the start of the sync byte.

Measure Bit Time Block 604 measures the number of relative clock cycles that transpire while receiving the SYNC portion of messages being transmitted on the LIN bus. The measured number of relative clock cycles (referred to as the 8 Bit Time) is an input value to Right Shifter 606, Right Shifter 608, and Adder 610.

Adder Block 610 adds the measured 8 Bit Time with the 8 Bit Time right shifted once and the 8 Bit Time right shifted twice to obtain a reference time that is the budget for each byte of the LIN message. The process of adding the 8 Bit Time with the 8 Bit Time right shifted once and the 8 Bit Time right shifted twice yields a value of approximately 140% of the measured 8 Bit Time.

Adder Block 612 adds the length of the message and constant number of bytes to obtain the total number of bytes in the current message. The "4.4" input to Adder Block 612 represents the constant size of the message header, while the "length" input represents the variable data portion size.

The reference time computed in Adder Block 610 and the byte count computed in Adder Block 612 are multiplied in Multiplier Block 614 to obtain a budget for the entire message. Comparator Block 616 compares the message budget with the number of clock cycles that transpired receiving the message. If the number of clock cycles is greater than the message budget, Comparator Block 616 outputs a message invalid signal to cause the message to be discarded by the LIN node. Otherwise, Comparator Block 616 outputs a message valid signal to cause the LIN node processes the message.

As will be appreciated, the processes in preferred embodiments of the present invention may be implemented using any combination of computer programming software, firmware or hardware. The method form of the invention may be practiced by combining software and/or hardware to complete the steps of the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A method comprising:
   receiving, over a network, a message at a receiver;
   counting an amount of time that elapses receiving a sync portion of the message over the network to determine a measured time;
   augmenting the measured time to calculate a budget, wherein calculating the budget comprises:
      right shifting, in a shifter, the measured time three times to calculate an intermediate result1;
      left shifting, in a shifter, the measured time one time to calculate an intermediate result2;
      left shifting, in a shifter, the measured time two times to calculate an intermediate result3;
      adding, in an adder, the intermediate result1 and the intermediate result2 and the intermediate result3 to calculate the budget;
   counting, in a counter, an amount of time that elapses receiving a portion of the message to determine a second time;
   comparing the second time with the budget;
   rejecting the message if the second time exceeds the budget; and
   processing, in a data processor, a data portion of the message if the second time does not exceed the budget.

2. The method of claim 1, wherein processing the data portion of the message comprises:
   counting an amount of time that elapses receiving the data portion of the message to determine a data time; and
   augmenting the measured time to calculate a data budget.

3. The method of claim 2, further comprising:
   comparing the data time with the data budget;
   rejecting the message if the data time exceeds the data budget; and
   accepting the message if the data time does not exceed the data budget.

4. The method of claim 1, wherein the portion of the message is a message header and the budget is a header budget, wherein the sync portion is within the message header.

5. The method of claim 4, wherein the header budget is 140% of the expected header time.

6. The method of claim 1, wherein the network is a Local Interconnect Network.

7. A system comprising:
   a first counter for measuring an amount of time that elapses receiving a sync portion of a message to determine a measured time;
   a first shifter for right shifting the measured time three times to calculate an intermediate result1;
   a second shifter for left shifting the measured time one time to calculate an intermediate result2;
   a third shifter for left shifting the measured time two times to calculate an intermediate result3;
   an adder for augmenting the measured time to calculate a budget, wherein the adder adds the intermediate result1 and the intermediate result2 and the intermediate result3 when calculating the budget;
   a second counter for counting an amount of time that elapses receiving a portion of the message to determine a second time; and
   a comparator for comparing the second time with the budget.

8. The system of claim 7, wherein the portion of the message is a message header and the budget is a header budget, wherein the sync portion is within the message header.

9. The system of claim 7, said system further comprising:
   a multiplier for multiplying the length of a data portion of the message by a reference time to calculate a data budget;
   wherein the second counter measures an amount of time that elapses receiving the data portion of the message to determine a data time; and
   wherein the comparator compares the data budget with the data time.

10. The system of claim 7, wherein the system is operable to be coupled to a Local Interconnect Network.

11. A system comprising:
    a counter for measuring an amount of time that elapses receiving a sync portion of a message to determine a measured time and for counting an amount of time that elapses receiving a portion of the message to determine a second time;
    a first shifter for right shifting the measured time three times to calculate an intermediate result1;
    a second shifter for left shifting the measured time one time to calculate an intermediate result2;
    a third shifter for left shifting the measured time two times to calculate an intermediate result3;
    an adder for augmenting the measured time to calculate a budget, wherein the adder adds the intermediate result1 and the intermediate result2 and the intermediate result3 to calculate the budget; and
    a comparator for comparing the second time with the budget.

12. The system of claim 11, wherein the portion of the message is a message header and the budget is a header budget, wherein the sync portion is within the message header.

13. The system of claim 11, said system further comprising:
    a multiplier for multiplying the length of a data portion of the message by a reference time to calculate a data budget;

wherein the counter measures an amount of time that elapses receiving the data portion of the message to determine a data time; and wherein the comparator compares the data budget with the data time.

14. The system of claim 11, wherein the system is operable to be coupled to a Local Interconnect Network.

15. A method comprising:

counting an amount of time that elapses receiving a sync portion of a message over a network to determine a measured time;

augmenting the measured time to calculate a budget by:

right shifting, in a shifter, the measured time one time to calculate an intermediate result1;

right shifting, in a shifter, the measured time two times to calculate an intermediate result2;

adding, in an adder, the intermediate result1 and the intermediate result2 and the measured time to calculate an intermediate result3;

multiplying the intermediate result3 with the length of the message to calculate the budget;

counting, in a counter, an amount of time that elapses receiving all of the message to determine a second time;

comparing the second time with the budget;

rejecting the message if the second time exceeds the budget; and processing, in a data processor, the message if the time does not exceed the budget.

* * * * *